United States Patent
Matsumoto

(10) Patent No.: US 8,284,889 B2
(45) Date of Patent: Oct. 9, 2012

(54) METHODS AND APPARATUSES FOR CLAMPING A JET PUMP SENSING LINE SUPPORT

(75) Inventor: Jack Toshio Matsumoto, Sunnyvale, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 849 days.

(21) Appl. No.: 12/385,784

(22) Filed: Apr. 20, 2009

(65) Prior Publication Data

US 2010/0266093 A1    Oct. 21, 2010

(51) Int. Cl.
*G21C 15/00* (2006.01)

(52) U.S. Cl. ........ 376/372; 376/370; 376/366; 376/361; 376/347

(58) Field of Classification Search .................. 376/372, 376/370, 366, 361, 347; 403/52, 76, 66; 417/65, 76, 87
See application file for complete search history.

(56) References Cited

U.S. PATENT DOCUMENTS

| | | | |
|---|---|---|---|
| 5,752,807 A * | 5/1998 | Erbes | 417/63 |
| 6,233,301 B1 * | 5/2001 | Robergeau | 376/302 |
| 6,386,786 B1 | 5/2002 | Perlman et al. | |
| 7,004,943 B2 * | 2/2006 | Ferrante et al. | 606/59 |

FOREIGN PATENT DOCUMENTS

| | | |
|---|---|---|
| DE | 19628689 A1 | 1/1998 |
| EP | 2048420 A2 | 4/2009 |
| EP | 2128504 A1 | 12/2009 |
| FR | 2689606 A1 | 10/1993 |

OTHER PUBLICATIONS

EP 10160380.1, Search Report and Written Opinion, Oct. 15, 2010.

* cited by examiner

*Primary Examiner* — Rick Palabrica
*Assistant Examiner* — Marshall O'Connor
(74) *Attorney, Agent, or Firm* — Harness, Dickey & Pierce, P.L.C.

(57) ABSTRACT

Example embodiment clamps may be used to clamp two components together, with a degree of freedom of motion between the clamped components, including both rotational and translational motion. Example embodiment clamps may clamp a BWR jet pump sensing line to a diffuser as a repair or installation of a sensing line support. Example clamps may include a ball subassembly that holds a component and allows rotation and twisting of the component within the clamp. Example clamps may further include jaws holding the ball subassembly and a biasing element that permits tightening of the clamp.

19 Claims, 8 Drawing Sheets

METHODS AND APPARATUSES FOR CLAMPING A JET PUMP SENSING LINE SUPPORT

BACKGROUND

1. Field

Example embodiments and methods generally relate to nuclear power plant components, specifically, jet pump sensing line support clamp apparatuses.

2. Description of Related Art

Generally, Boiling Water Reactors (BWRs) include jet pumps as part of a recirculation system to effectively move coolant and moderator through a nuclear core. In order to evaluate operating conditions within the nuclear core, it may be desirable to monitor flow rate through the core, including flow rate of coolant from the jet pumps. Typically, a jet pump sensing line is used to measure flow rate from the jet pumps by measuring a pressure differential in the jet pumps.

FIGS. 1 and 2 are illustrations of related art jet pump sensing lines 100 coupled to a lower diffuser shell 110 at the base of the jet pumps by sensing line supports 120 welded to both the diffuser shell 110 and the jet pump sensing lines 100. The sensing lines 100 are conventionally welded to the supports 120.

The jet pump sensing lines 100 shown in FIGS. 1 and 2 may be installed within a BWR core and are accessible only during scheduled plant outages for refueling and repair. These outages occur at several month intervals, and thus components within the core, including the jet pumps and jet pump sensing lines 100, must operate for lengthy periods before being inspected or repaired.

BWR core operating conditions may include high levels of vibration and radioactivity. Components within the core, including jet pump sensing lines 100 and sensing line supports 120, may be subject to premature damage due to stress-corrosion and vibration-induced cracking.

SUMMARY

Example embodiments are directed to clamps for use in clamping two components with a degree of freedom of motion between the clamped components. Example embodiment clamps may clamp a BWR jet pump sensing line to a diffuser as a repair or installation of a sensing line support. Example clamps may include a ball subassembly that holds a component and allows rotation and twisting of the component within the clamp. Example clamps may further include jaws holding the ball subassembly and a biasing element that permits tightening of the clamp. Example methods include methods of installing and using example embodiment clamps in various environments, including nuclear reactors.

BRIEF DESCRIPTIONS OF THE DRAWINGS

Example embodiments will become more apparent by describing, in detail, the attached drawings, wherein like elements are represented by like reference numerals.

DETAILED DESCRIPTION

Detailed illustrative embodiments of example embodiments are disclosed herein. However, specific structural and functional details disclosed herein are merely representative for purposes of describing example embodiments. For example, although example embodiments may be described with reference to an Economic Simplified Boiling Water Reactor (ESBWR), it is understood that example embodiments may be useable in other types of nuclear plants and in other technological fields. The example embodiments may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
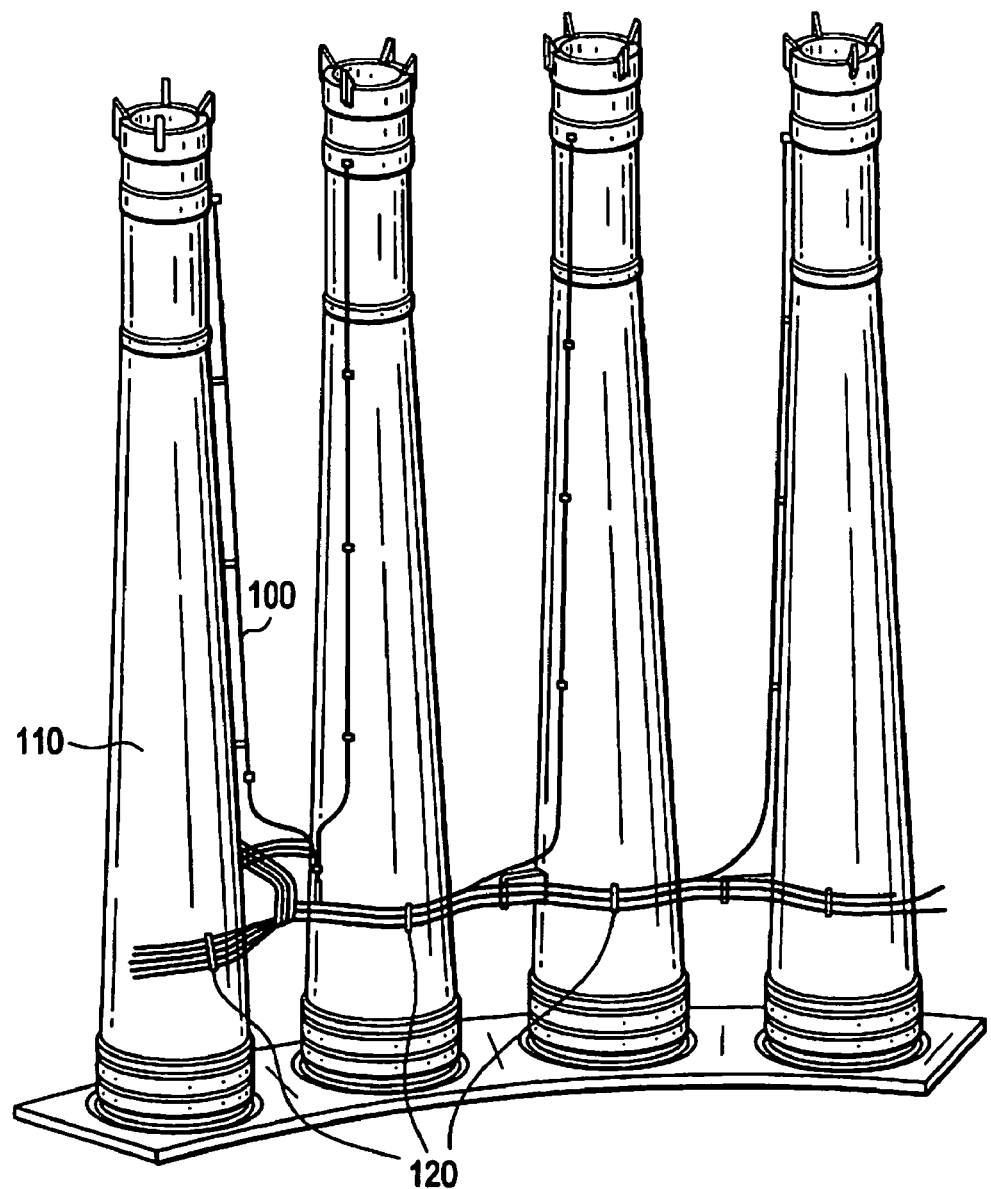
FIG. 1 is an illustration of related art BWR jet pump nozzles with jet pump sensing lines.
Figure 2:
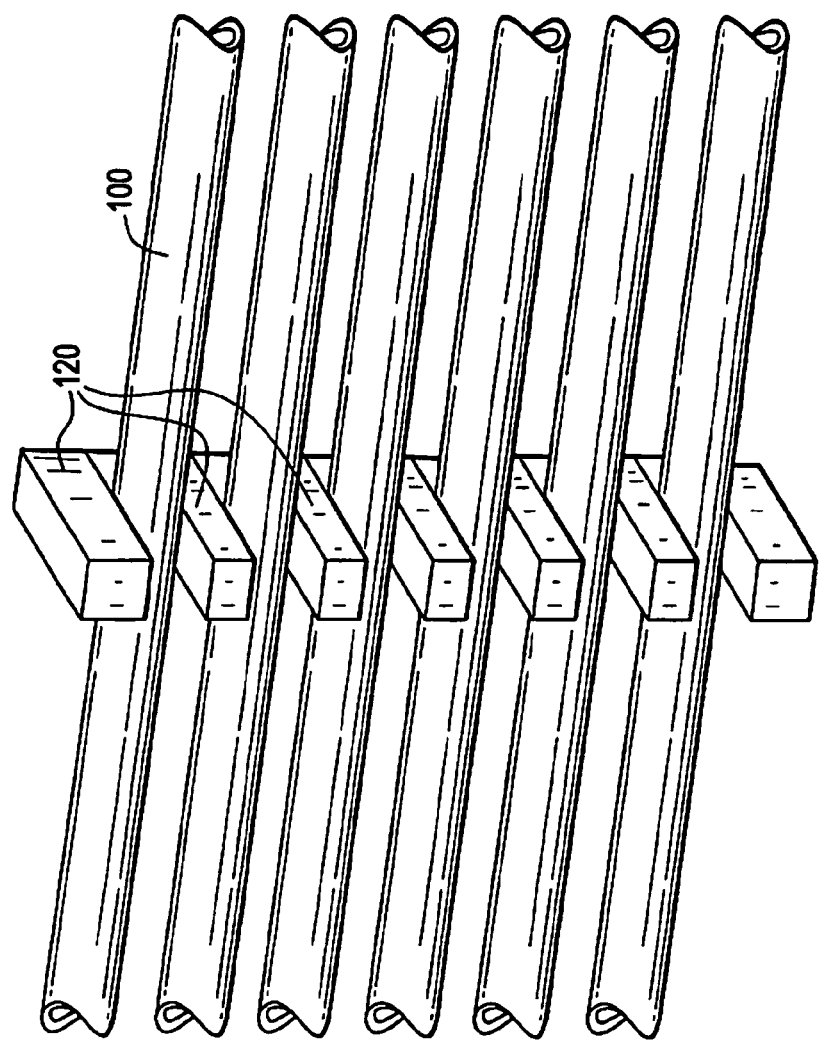
FIG. 2 is detailed view of the jet pump sensing lines and support shown in FIG. 1.

The inventor has recognized that the combination of flow-induced vibration, lengthy operating cycles, and radiation degradation may cause conventional jet pump sensing lines and welds to fail, allowing the jet pump sensing lines 100 (FIGS. 1 and 2) to become unseated from their support 120 (FIGS. 1 and 2) and become damaged and/or damage other core components. The inventor has further recognized that flow-induced vibration and resulting damage may increase as power plants including jet pumps are up-rated to produce more power and electricity, as is common and desirable with rising energy costs. Related art repair typically includes re-welding broken supports during plant outages, and the inventor has recognized these related methods may worsen flow-induced vibration and constrain jet-pump sensing lines to less-than-optimal positions and configurations. Example embodiments and methods address and/or relieve these problems in a novel and unexpected manner.

Figure 3:
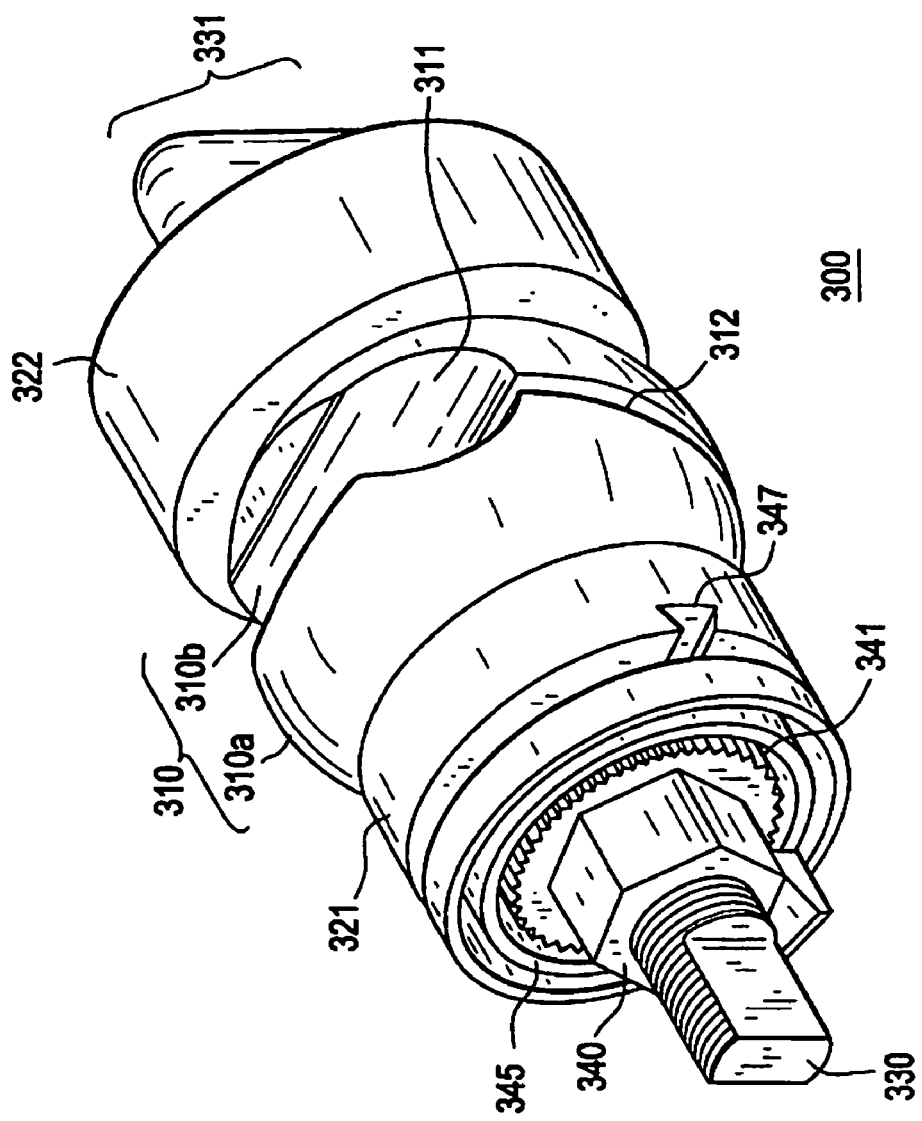
FIG. 3 is an isometric view of an example embodiment clamp.
Figure 5:
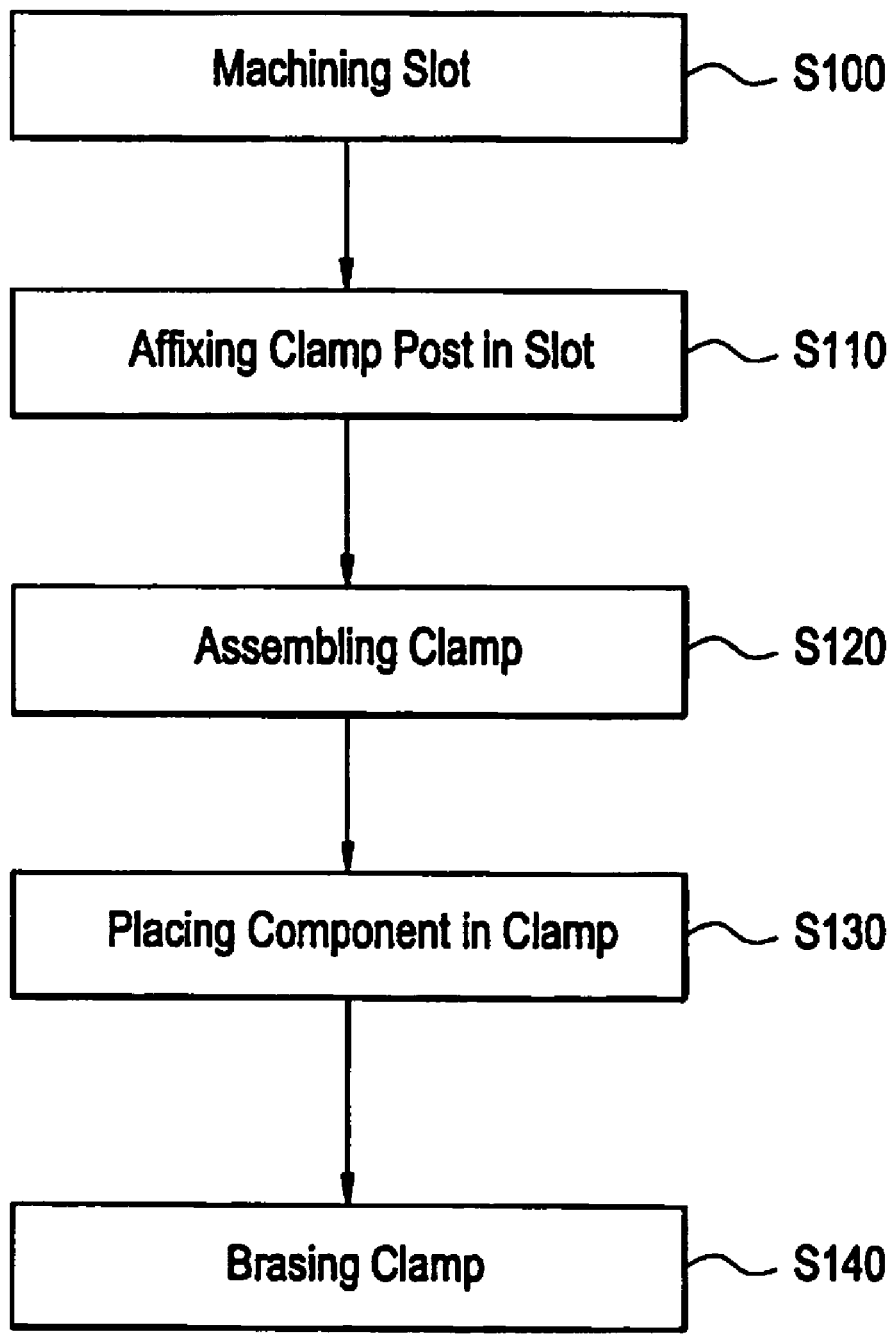
FIG. 5 is a flow chart of an example method of assembling an example embodiment clamp.
Figure 6:
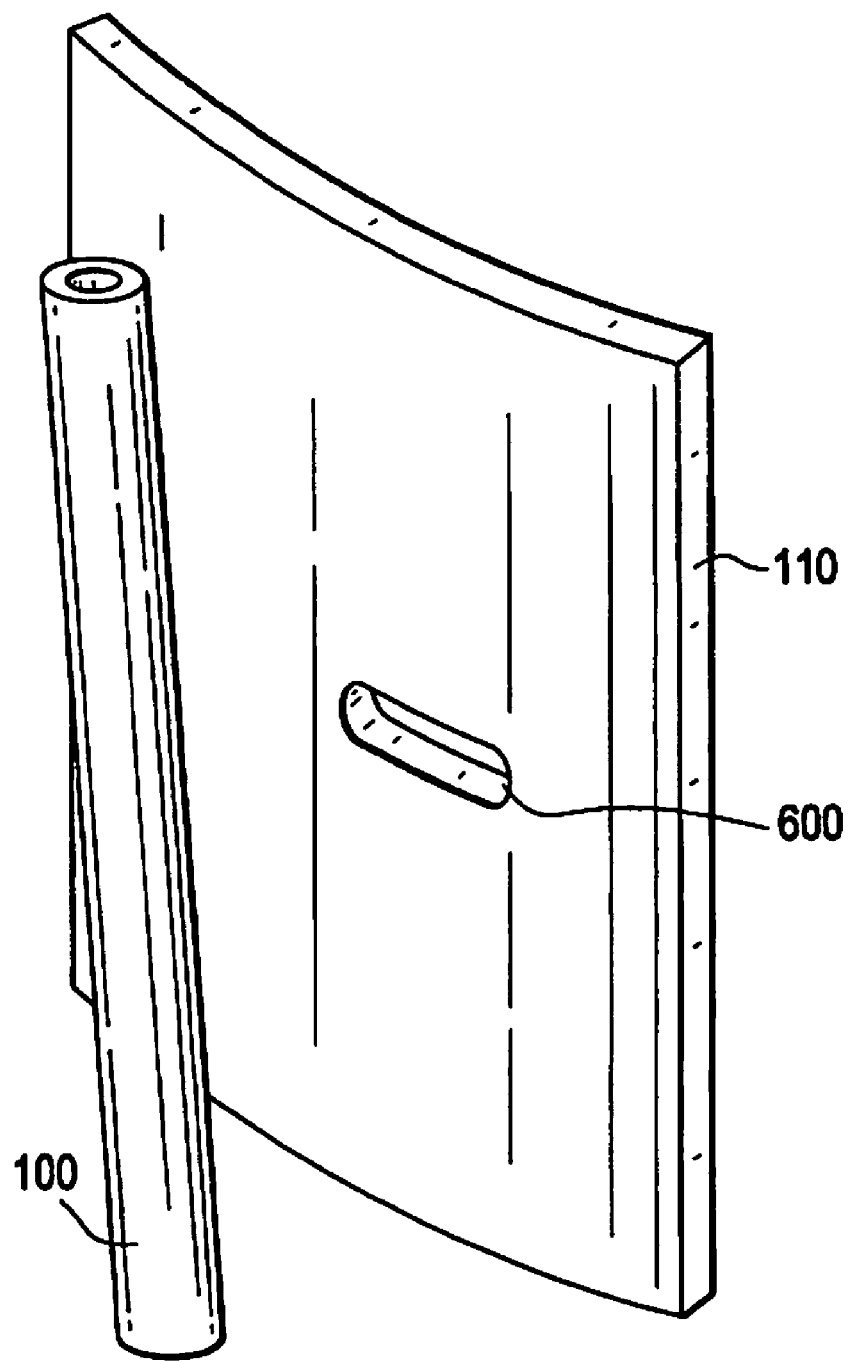
FIG. 6 is an illustration of an example embodiment method of assembling an example embodiment clamp.

Various potential features of example embodiment clamps are described with reference to FIGS. 3-4, with example methods of operating and assembling clamps discussed with reference to FIGS. 5 and 6. FIG. 3 is an isometric view of an example embodiment jet pump sensing line clamp 300. As shown in FIG. 3, clamp 300 includes a ball subassembly 310, clamps jaws 321 and 322, clamp post 330, and a biasing mechanism 340.

Ball subassembly 310 may be substantially spherical or elliptical; alternatively, ball subassembly 310 may be other shapes that permit a desired type of movement within example embodiment clamp 300. Ball subassembly 310 may be substantially solid and/or continuous. Alternatively, ball subassembly 310 may include several distinct sections and/or have gaps or missing sections. As shown in FIG. 3, ball subassembly may be divided into two hemispheres 310a and 310b, which may allow easier assembly and use of example embodiment clamps, as discussed below. Hemispheres 310a and 310b may be flush or slightly separated by a gap 312 permitting access to an interior portion of ball subassembly 310.

Ball subassembly 310 includes an aperture 311 that is sized to permit a jet pump sensing line (not shown) to pass therethrough and to retain the jet pump sensing line therein, at least in a radial direction with respect to ball subassembly 310. For example, aperture 311 may have a slightly larger inner diameter than an outer diameter of a jet pump sensing line, allowing the sensing line to "slide" in aperture 311 in a linear direction along jet pump sensing line but not in the radial direction with respect to ball subassembly 310. Alternately, aperture 311 may have a substantially similar inner diameter as the outer diameter of a jet pump sensing line, preventing any "sliding" or movement of jet pump sensing line in the linear direction. Aperture 311 may be circumferentially closed and entirely within ball subassembly 310 or may be circumferentially open, as shown in FIG. 3, to a degree that permits access to a jet pump line and yet still holds a jet pump sensing line within ball subassembly 310. Aperture 311 need not be cylindrical; aperture 311 may have a square, triangular, elliptical, etc. cross section so long as it retains a jet pump sensing line within ball subassembly 310.

Figure 4:
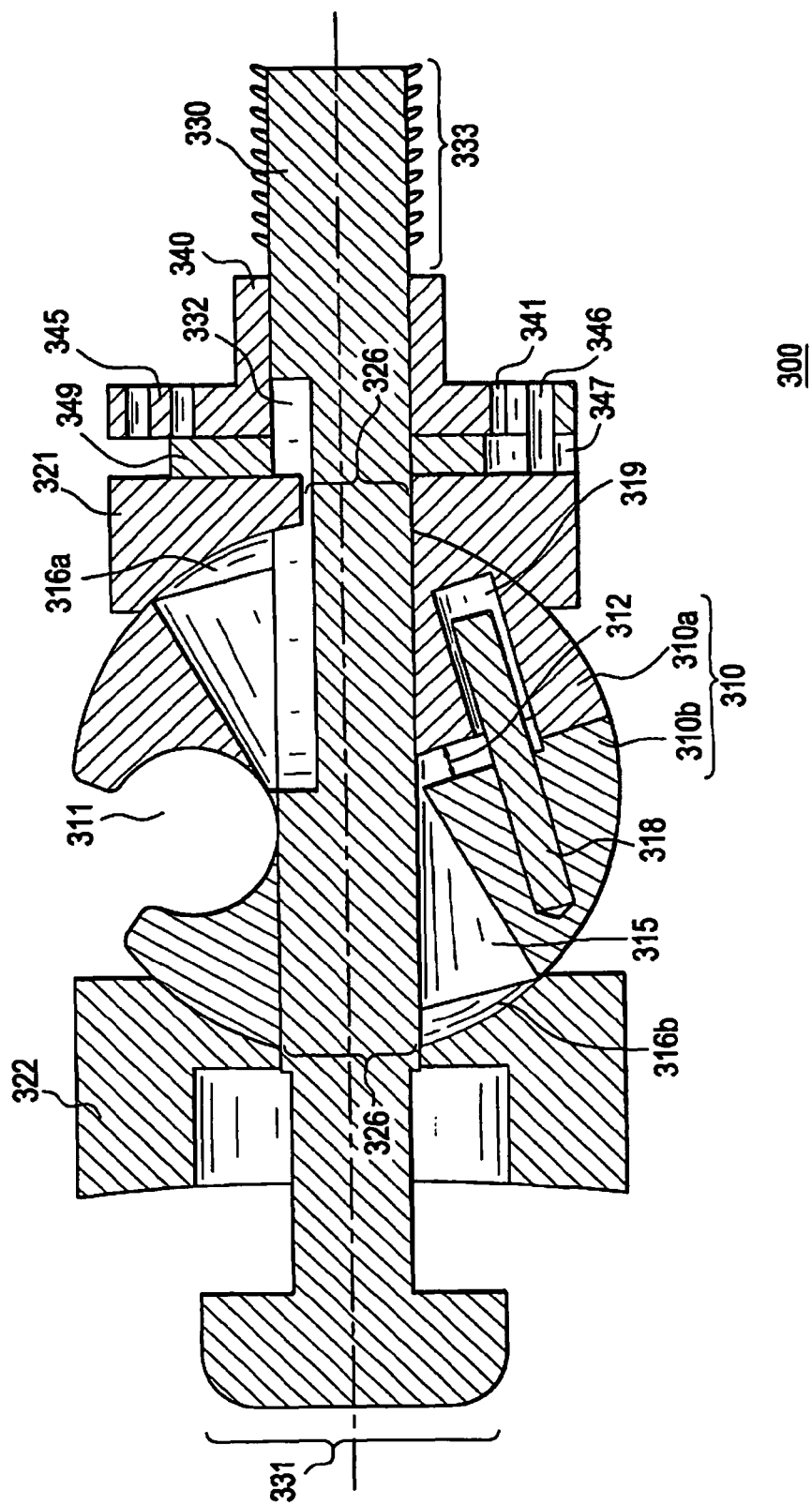
FIG. 4 is a cross-sectional view of the example embodiment clamp of FIG. 3.

FIG. 4 is a cross-sectional view of example embodiment clamp 300, with like numbering indicating like features, whose redundant description may be omitted. As shown in FIG. 4, ball subassembly 310 includes a central cavity 315 defined by internal edges of ball subassembly 310 and holes 316a and 316b at either end of ball subassembly 310. Central cavity 315 and holes 316a and 316b permit a clamp post 330 to pass through ball subassembly 310 and are thus at least somewhat larger than an exterior diameter of clamp post 330. Central cavity 315 and holes 316a and 316b may have a variety of shapes and sizes, in order to permit a desired degree of motion of ball subassembly 310 and/or clamp post 330 passing therethrough.

For example, cavity 315 may have a partially conical or "hourglass" shape as shown in FIG. 4 that permits ball subassembly 310 to rotate about any central axis to a desired degree and limits translation of ball subassembly away from clamp post 330 when clamp post 330 passes through cavity 315 and holes 316a, b. The desired degree of rotation permitted by cavity 315 may allow aperture 311 and a jet pump sensing line to rotate, twist, and or re-orient about clamp post 330 but prevent rotation or twisting beyond clamp jaws 321 and 322. Alternatively, central cavity 315 may be largely cylindrical and limit rotation of ball subassembly 310, aperture 311, and a jet pump sensing line therein to only about a length-wise axis of clamp post 330. Still alternately, central cavity 315 and/or holes 316a,b may lock into clamp post 330, preventing any movement of ball subassembly 310, aperture 311, and/or a jet pump sensing line relative to clamp post 330. Other shapes and configurations of cavity 315 and holes 316a,b are of course possible, based on a desired type of motion between ball subassembly, clamp post 330, aperture 311 and/or a jet pump sensing line attached to example embodiment clamps.

If example embodiment clamps include a ball subassembly having multiple, distinct sections, such as hemispheres 310a and 310b, for example, an internal pin 318 and socket 319 may be used to maintain a desired orientation of the distinct sections with each other. For example, if cavity 315 and/or holes 316a, b permit hemispheres 310a and 310b to rotate in opposite directions or achieve other undesired spacial relationships, pin 318 and socket 319 in respective hemispheres 310b and 310a may prevent the undesired movement yet allow other movement, such as radial expansion, for example. Other joining mechanisms between ball subassembly 310 elements, internal or external, may be used in example embodiments, including, for example, slot-and-groove, tang-and-receptor, adhesives, etc.

As shown in FIG. 4, example embodiment clamp 300 includes a pair of clamp jaws 321 and 322. Clamp jaws 321 and/or 322 are configured to seat against ball subassembly 310 and bias sections and/or moveable parts of ball subassembly 310, including, for example, hemispheres 310a and 310b. Clamp jaws 321 and 322 may include, for example, a concave surface that meets or mates with a surface of ball subassembly 310; such a surface may be lubricated, include ball bearings, or the like, to facilitate smooth movement between ball subassembly 310 and jaws 321 and/or 322. Clamp jaws 321 and 322 may further include a central passage 326 that permits clamp post 330 to pass therethrough and hold and align clamp jaws 321 and 322 and ball subassembly 310. Either clamp jaw, such as clamp jaw 322 in FIG. 4, may include a surface shaped to substantially and evenly seat against a component to which a jet pump sensing line is to be clamped, such as a jet pump diffuser shell 110 (FIG. 1), for example. Either clamp jaw, such as clamp jaw 322 in FIG. 4, may include a recess shaped to permit end 331 to recess into clamp jaw 322. Clamp jaws 321 and 322 may alternatively be shaped and configured in different manners to provide a desired degree of motion of ball subassembly 310 and/or union with an attached component, for example.

Example embodiment clamp further includes a clamp post 330 that extends axially through various components discussed above, including ball subassembly 310 and clamp jaws 321 and 322. Clamp post 330 may align and hold clamp components through which it passes. Clamp post 330 may include a T-shaped attaching end 331 that is shaped to pass through a slot in a component to be clamped to and lock in the slot in the component so as to not be able to be withdrawn back through the slot, when turned 90-degrees, as discussed below with regard to example methods. Other shapes and attachment configurations and mechanisms are possible for attaching end 331 while still securing example embodiment clamps to desired components. Clamp post 330 may include a recessed area 332 in which a portion of jaw clamp 321 may be seated, in order to restrict the range of motion of jaw clamp 321 along clamp post 330. Alternate recesses and/or stops may be placed on clamp post 330 in order to control and/or restrict the motion of other components through which clamp post 330 passes. Clamp post 330 may also include a threaded end 333 having threads of an appropriate size in order to, for example, tighten a biasing element such as a ratchet nut 340 (discussed below) on example embodiment clamps.

As shown in FIG. 4, example clamp assemblies may further include a biasing element such as a ratchet nut 340 and a ratchet nut lock 345. Ratchet nut 340 may include an inner surface that engages clamp post 330, such as with threads that engage threaded end 333, for example. Ratchet nut may further include a flange including a saw-toothed ratchet surface 341 (FIG. 3). Ratchet nut lock 345 may include a post and spring 346 that engages the saw-toothed surface 341 and permits one-way rotation of ratchet nut 340 with respect to ratchet nut lock when surfaces 341 and post 346 are meshed. For example, post 346 may slide over the teeth of surface 341 when moving in one direction but limit or prevent motion of teeth in the opposite direction due to the shaping of teeth of surface 341. This relationship between post and spring 346 and surface 341 of ratchet nut lock 345 may permit rotation and tightening of ratchet nut 340, without counter-rotation or loosening when no force is applied to ratchet nut 340. A release slot 347 may allow access to post 346 to release post 346 from the teeth of the ratchet nut 340, permitting counter-rotation and loosening of ratchet nut 340. Other biasing elements are useable with example embodiments, including a simple nut and screw, spring, etc.

A biasing plate 349 may be placed between the biasing element and clamp jaw 321. Biasing plate 349 may be a collar or washer that enhances seating and reduces abrading between biasing elements and clamp jaws. For example, ratchet nut 340 may bias against biasing plate 349, and ratchet nut lock 345 may be attached to biasing plate 349 and/or jaw clamp 321 to remain stationary relative to rotation of ratchet nut 340.

If example embodiment clamps are to be used in nuclear reactors, each component of example embodiment clamps may be fabricated from materials that will substantially maintain their physical properties in a nuclear reactor environment. For example, the ball subassembly 310, jaws 321 and 322, and/or clamp post 330 may be fabricated from an austenitic stainless steel and/or similar material. It may be desirable to vary the materials used for components to reduce corrosion and/or galling. For example, the ball subassembly 310 may be fabricated from Type 316 austenitic stainless steel, whereas jaws 321 and 322, and/or clamp post 330 may be fabricated from Type XM-19 stainless steel to prevent galling with the Type 316 stainless steel.

An example embodiment clamp 300 being described, example methods of installing and using example clamps are described below with reference to FIG. 5. As shown in FIG. 5, an example method include machining a slot 600 (FIG. 6) in a component to be clamped to proximate to a component to be clamped in Step S100. FIG. 6 illustrates an example method using a jet pump sensing line 100 and diffuser shell 110. The slot 600 may be machined in any known manner, including, for example Electrical Discharge Machining. Slot 600 may be shaped in a manner that permits passage of a clamp post 330 (FIG. 4) therethrough. Further, slot 600 may be shaped to hold clamp post 330 and prevent removal of the same after the clamp post is inserted and rotated. For example, slot 600 may be rectangular and allow T-shaped end 331 (FIG. 4) of clamp post 330 to pass through slot 600.

Figure 7:
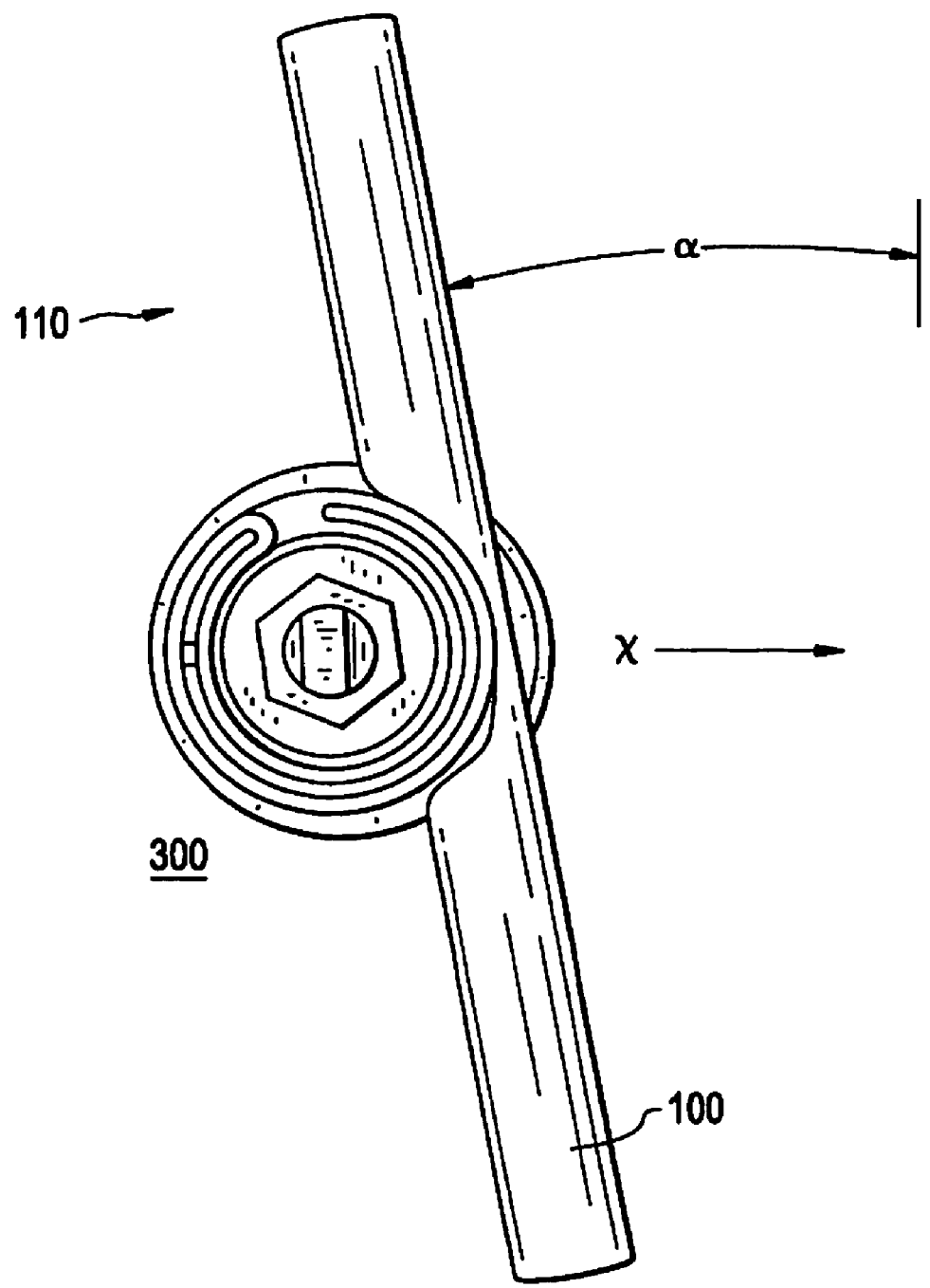
FIG. 7 is a front view of an example embodiment clamp in use.

In step S110, clamp post 330 is affixed in slot 600. This step may be achieved in several ways. As discussed above in example embodiments, clamp post 330 may be inserted through diffuser shell 110 slot 600 and subsequently rotated to "lock" a T-shaped end 331 through slot 600. The T-shaped end 331 may further permit movement of clamp post 330 along slot 600 in a transverse direction, as shown in FIG. 7, but prevent clamp post 330 from exiting slot 600 entirely. Or, for example, clamp post 330 and slot 600 may be shaped in other ways to allow a desired type of motion of clamp post 330. Similarly, other attachment devices and methods may be used, including, for example, a tongue-and-groove, welding, bolting, etc.

In step S120, components of an example embodiment clamp are aligned and/or placed on clamp post 330 affixed in slot 600. For example, a first clamp jaw 322, ball subassembly 310, second clamp jaw 321, biasing plate 349, and/or 345 ratchet nut lock (all FIG. 4) may be placed on clamp post 330, with clamp post 330 passing serially through these components. As discussed above, first clamp jaw 322 may be shaped to seat against the component having slot 600. Additional or fewer clamping components may be placed on clamp post 330, and individual sections of ball subassembly 310 may be placed on clamp post 330 individually and aligned to provide an aperture 311.

In step S130, a component to be clamped, such as jet pump sensing line 100, is placed within ball subassembly 310, such as in aperture 311. An example embodiment clamp may be rotated or moved in slot 600 to properly position the component to be clamped in the clamp.

In step S140, the clamp is then biased by a biasing element to secure the clamped component to the component to be clamped to. The biasing may further secure the clamp to the component to be clamped to. For example, ratchet nut 340 may be screwed down clamp post 330 on treaded end 333, bias against and clamp the clamp jaws 321 and 322 against ball subassembly 310, and hold a jet pump sensing line 100 within aperture 311, while also biasing T-shaped end 331 against an interior of the jet pump diffuser shell 110 and securing clamp 300 thereto. Example embodiment clamps can be tightened to any desired degree in step S140, depending on the configuration of example embodiment clamps and a desired degree of force applied to the clamped component.

Figure 8:
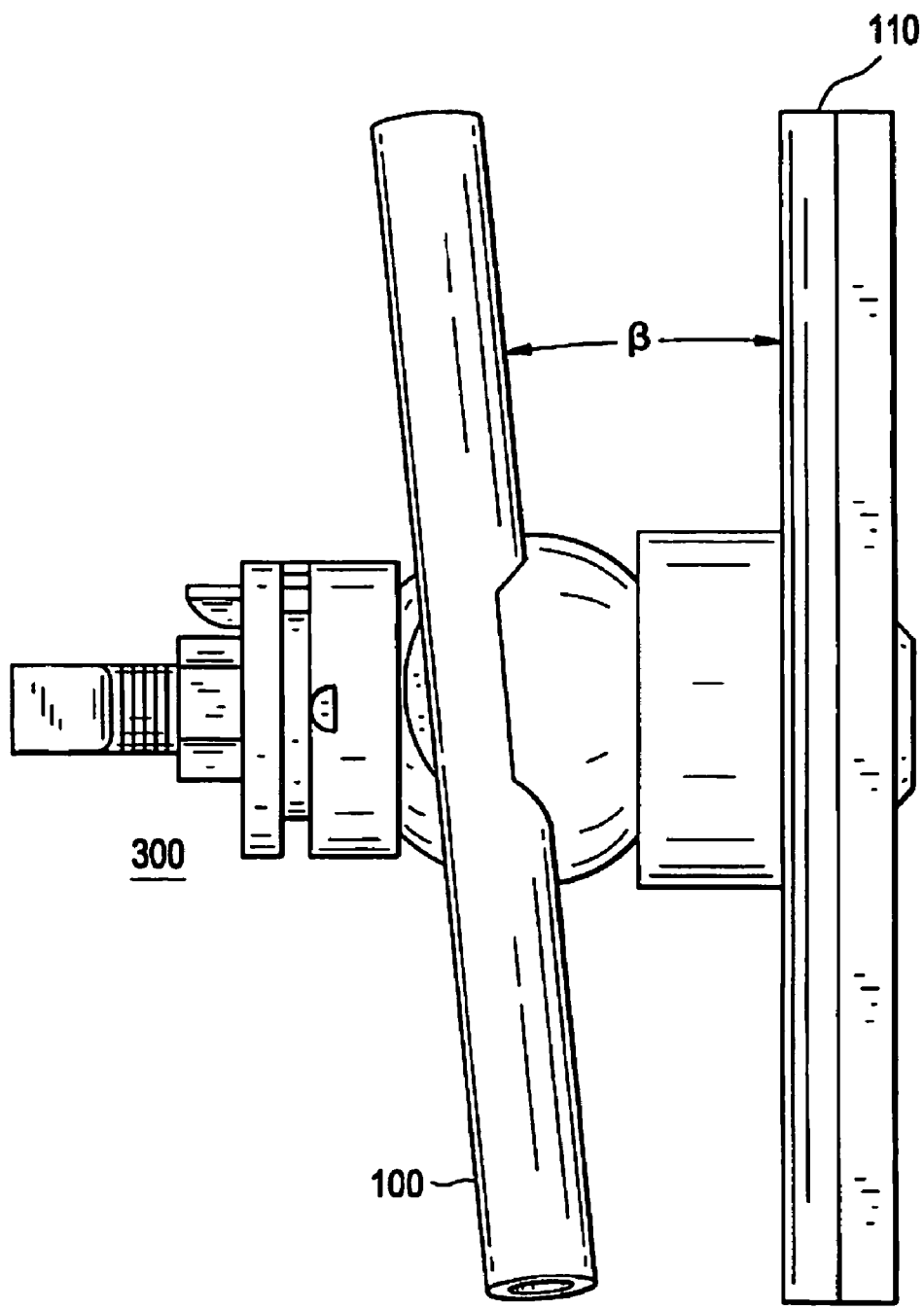
FIG. 8 is a side view of an example embodiment clamp in use.

Through example embodiments and methods, two components may be held or clamped with a desired degree of freedom of movement between the components. This may reduce the effects of vibration and clamping stress caused by rigid clamping or welding. As shown in FIG. 7, a jet pump sensing line 110 may freely rotate in a direction $\alpha$ in example embodiment clamps, preventing stress and vibration damage to sensing line 100 or diffuser shell 110 that may occur if held rigidly in the $\alpha$ direction. Further, example embodiment clamp 300 may translate in an x direction due to shaping of slot 600 and T-shaped end 331, allowing sensing line 100 to translate relative to diffuser shell 110. As shown in FIG. 8, a jet pump sensing line 110 may further rotate in a different direction $\beta$ while clamped with example embodiment clamps, preventing stress and vibration damage to sensing line 100 or diffuser shell 110. Example embodiments and methods may thus permit several degrees of freedom of movement in sensing lines while maintaining sensing lines in proximity to other clamped components. These degrees of freedom may reduce or prevent vibration-induced damage in sensing lines and/or other clamped components.

Example embodiments and methods thus being described, it will be appreciated by one skilled in the art that example embodiments may be varied through routine experimentation and without further inventive activity. For example, although example embodiments have been described with reference to a diffuser and jet pump sensing line, other components may be clamped with example embodiments and methods. Variations are not to be regarded as departure from the spirit and scope of the exemplary embodiments, and all such modifications as would be obvious to one skilled in the art are intended to be included within the scope of the following claims.

What is claimed is:

1. A clamp comprising:
   a spherical subassembly defining a receiving aperture, the receiving aperture directly attachable to a sensing line;
   opposing first and second clamp jaws cradling the spherical subassembly to adjustably permit rotation of the spherical subassembly between the clamp jaws;
   a clamp post running through the first and second clamp jaws and the spherical subassembly; and
   a biasing element on the clamp post, the biasing element configured to bias the first clamp jaw and second clamp jaw against the ball subassembly.

2. The clamp of claim 1, wherein the spherical subassembly defines a central cavity, and wherein the clamp post passes through the central cavity.

3. The clamp of claim 2, wherein the central cavity is partially conical in shape so as to permit rotation of the spherical subassembly about any central axis.

4. The clamp of claim 1, wherein the biasing element includes a ratchet nut and a ratchet nut lock on the clamp post, and wherein at least a portion of the clamp post is threaded such that the ratchet nut may be screwed on the clamp post.

5. The clamp of claim 1, further comprising:
   a biasing plate between the biasing element and one of the clamp jaws.

6. The clamp of claim 1, wherein the spherical subassembly includes a plurality of sections configured to be biased against each other.

7. The clamp of claim 6, wherein the spherical subassembly includes at least one a pin configured to align the plurality of sections.

8. The clamp of claim 1, wherein the spherical subassembly is shaped to permit the sensing line to rotate about at least two perpendicular axes of the clamp post.

9. The clamp of claim 1, wherein the clamp post is configured to attach to a diffuser shell, the clamp post being configured to permit translational motion of the clamp with respect to the diffuser shell while remaining attached to the diffuser shell.

10. The clamp of claim 9, further comprising:
    a "T" shaped end, on the clamp post, configured to attach to the diffuser shell.

11. A clamp comprising:
    a spherical subassembly defining an aperture shaped to hold a tubular member within the aperture;
    a first clamp jaw and a second clamp jaw on opposing sides of the spherical subassembly, each of the clamp jaws having a concave surface that seats against the spherical subassembly to permit rotation of the spherical subassembly between the clamp jaws;
    a clamp post running through the first and second clamp jaws and the spherical subassembly;
    a ratchet nut lock on the clamp post;
    a ratchet nut threaded on the second end of the clamp post, the ratchet nut configured to bias the first clamp jaw and second clamp jaw against the spherical subassembly; and
    a biasing plate between the ratchet net lock and one of the clamp jaws.

12. A method of securing a jet pump sensing line to a jet pump diffuser shell in a nuclear reactor, the method comprising:
    machining a slot in the jet pump diffuser shell;
    affixing a clamp post in the slot;
    placing at least a first clamp jaw, a second clamp jaw, a spherical subassembly between the first and second clamp jaws, and a biasing element on the clamp post so as to assemble a clamp, the clamp post running through the first and second clamp jaws and the ball subassembly;
    placing the jet pump sensing line within an aperture of the spherical subassembly; and
    biasing the clamp.

13. The method of claim 12, wherein the machining includes electrical discharge machining.

14. The method of claim 12, wherein the affixing includes inserting the clamp post into the slot and rotating the clamp post so as to engage a first end of the clamp post with a surface of the jet pump diffuser shell.

15. The method of claim 12, wherein the biasing element includes a ratchet nut lock and ratchet nut, and wherein the biasing includes screwing the ratchet nut on the clamp post.

16. The method of claim 12, further comprising: placing a biasing plate between the biasing element and one of the clamp jaws on the clamp post.

17. The clamp of claim 11, wherein the clamp post includes a first end with a T-shape directly attachable to a jet pump diffuser shell, the clamp post including a threaded second end.

18. The clamp of claim 11, wherein the aperture is configured to hold a tubular jet pump sending line.

19. The clamp of claim 11, wherein,
    the spherical subassembly defines a partially conical shaped central cavity so as to permit rotation of the spherical subassembly about any central axis,
    the clamp post passes through the central cavity.

* * * * *